Patented July 10, 1951

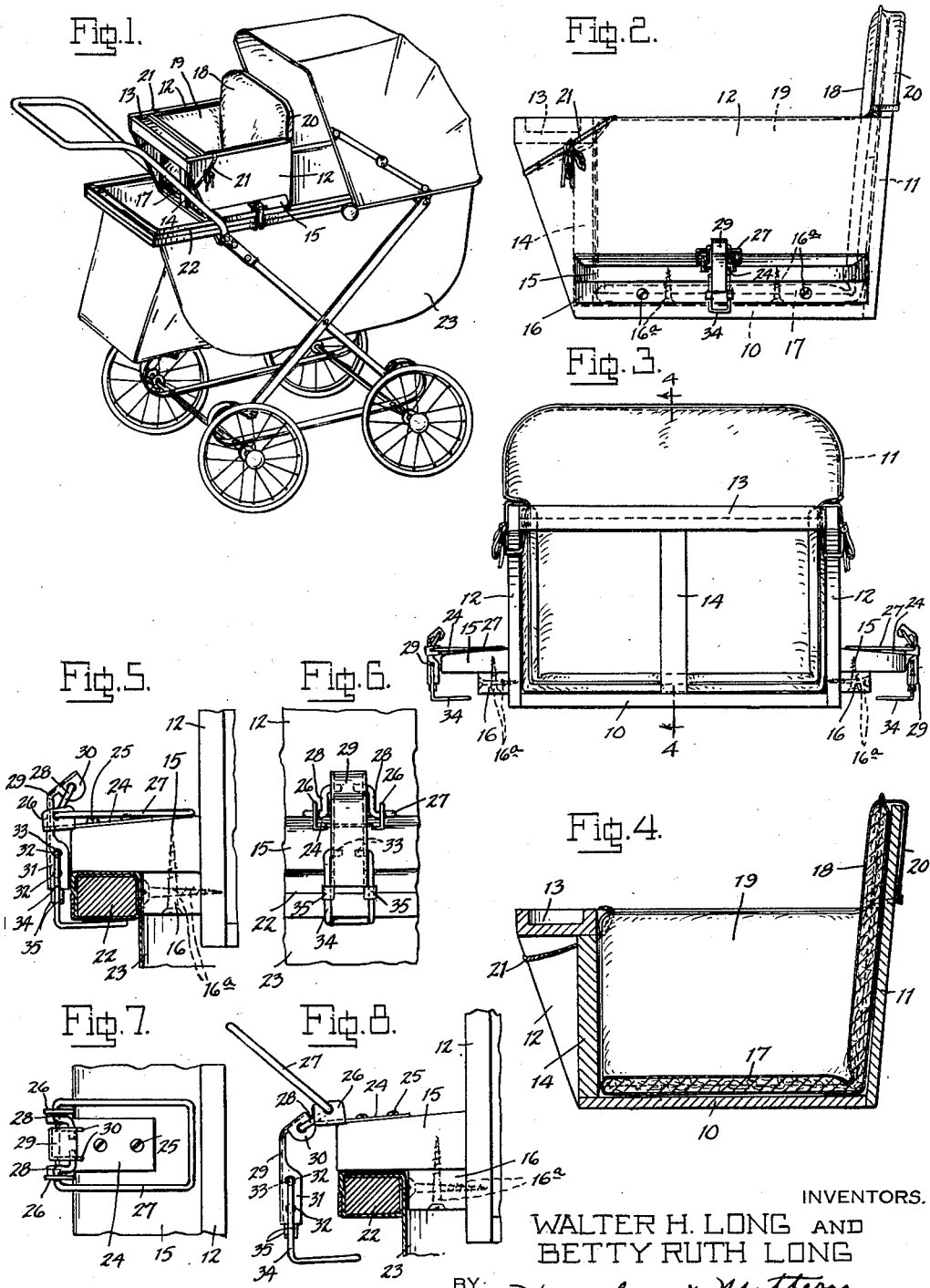

2,560,458

UNITED STATES PATENT OFFICE 2,560,458

AUXILIARY SEAT FOR BABY BUGGIES AND FASTENING MEANS THEREFOR

Walter H. Long and Betty Ruth Long, San Luis Obispo, Calif.

Application October 12, 1948, Serial No. 54,054

2 Claims. (Cl. 155—10).

The present invention relates to an auxiliary seat for baby buggies and fastening means therefor, and has for its object to provide an auxiliary seat especially designed for attachment to the modern type of baby buggy wherein the body part is provided at its upper edge with a rigid frame of rectangular form having horizontal parallel side rails. It is particularly proposed to provide an auxiliary seat which may be firmly mounted upon such side rails, and secured thereto in any desired position of forward or rearward adjustment, thus providing a seat for a small child without interfering with the accommodation for the infant for which the buggy is normally designed. A further object is to provide an auxiliary seat having supporting means for slideably engaging the side rails of the baby buggy frame, so that by adjusting the seat to a position adjacent the forward edge of the frame the child may sit therein with its legs hanging out of the buggy, and by adjusting the seat to an intermediate position the child's legs may be placed within the buggy and particularly within the extension boot usually provided on buggies of this type. This not only provides for the comfort of the child in both warm and cold weather, but permits such variation in the positioning of the seat when the child becomes restless.

Another object is to provide an auxiliary seat having a tray structure incorporated therein, which in addition to providing a support for the child's arms and for toys or other objects, also provides a retaining guard to safely hold the child in the seat. Another object is to provide an improved pad for the seat which may be readily attached and removed for cleaning purposes.

A further object is to provide improved fastening means for quickly and securely fastening the seat in place, and further to provide such fastening means which is adjustable to side rails of different thicknesses. A further object is to provide a seat which is adjustable to buggies of different widths.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a perspective view showing a baby buggy with the auxiliary seat attached thereto at a position of adjustment where the child's legs may be placed within the extension boot of the baby buggy.

Fig. 2 is a side elevation of the auxiliary seat.

Fig. 3 is a front elevation.

Fig. 4 is a vertical sectional view, taken along the line 4—4 of Fig. 3.

Fig. 5 is a detail side elevation of the fastening clamp at one side of the seat shown in closed or clamping relation to the side rail, the latter being shown in vertical section.

Fig. 6 is a front elevation of the fastening clamp.

Fig. 7 is a top plan view.

Fig. 8 is a side elevation showing the fastening clamp in open or disengaged relation to the side rail.

Similar reference characters indicate corresponding parts throughout the several figures of the drawings.

Referring to the drawings, the auxiliary seat, according to the illustrated exemplary embodiment of the invention shown therein, comprises a base 10, a back 11, sides 12—12, a transverse tray 13 extending between the sides 12 at the upper forward corners thereof, and a centrally disposed vertical strut 14 extending between the base 10 and the underside of the tray 13. The strut is adapted to support the tray, and also to provide with the tray a safety guard to keep the child in the seat, the child's legs being disposed at each side of the strut. Upon the outer side of each of the sides 12 there is secured a horizontal outwardly projecting cleat 15, having a bracing strip 16 at its underside of rectangular cross-section and secured by vertical and horizontal screws 16a respectively engaged in the cleat 15 and in the side 12. By turning the strip 16 from the horizontal position, as shown, to a vertical position the seat is made to fit a narrower buggy, this being made possible by the provision of the screw holes for the vertical and horizontal screws 16a, either of which may be secured in either the cleat 15 or the side 12. It is pointed out that the strips when turned into vertical position from the horizontal position as shown in Fig. 3 are turned end to end, that is the ends which are forward are turned rearward, so as to dispose the screws which are turned from vertical to horizontal position in an inward direction with respect to the sides 12. The seat may be conveniently and economically constructed of pieces of plywood and suitably shaped wood strips, nailed, glued, screwed or otherwise secured together. It will be understood that the seat may also be partially or entirely constructed of other suitable materials, such as moulded plastics, aluminum castings, etc.

The seat is provided with a suitable one-piece pad constructed to fit the interior surfaces and comprising a base portion 17, a back portion 18 and side portions 19—19, the back portion being provided at its upper end with a pocket 20 adapted to receive the upwardly projecting end of the back 11 of the seat. At the upper forward corners of the side portions 19 of the pad there are provided tie-strings 21, which are adapted to be extended beneath the tray 13 and tied about the forward corners of the sides 12 of the seat, the tie-strings and the pocket 20 effectually retaining the pad in place.

As shown clearly in Fig. 1 the seat is adapted to be supported upon the parallel horizontal side rails of the rectangular frame 22 of the baby buggy 23, the cleats 15 resting upon the upper surfaces of the side rails and the strip member 16 engaging the inner surface to prevent lateral displacement of the seat. The seat is thus firmly supported and may be slid forwardly or rearwardly to any desired position where it is secured by fastening clamps presently to be more fully described. Baby buggies of the type illustrated are manufactured in standard sizes, as for instance 16 inch and 18 inch outside widths. In the horizontal position of the strip 16 as shown in Fig. 3 the seat will fit an 18 inch width. By turning the strips 16 into a vertical position the seat will fit a 16 inch width.

Upon each of the cleats 15 there is secured a fastening clamp, shown in detail in Figs. 5 to 8, and comprising a base plate 24 secured by screws 25 to the cleat and provided at its outer end with ears 26—26, in which are pivotally engaged the side legs of a U-shaped handle member 27 formed of bent wire and provided with crank extensions 28—28 which are pivotally connected to a sheet metal connector member 29 having inwardly bent ears 30—30 at its upper end in which the bent ends of the crank extensions are pivotally engaged. The connector member is provided at its lower portion with inwardly extending ears 31—31, each having a plurality of holes 32 in which the bent ends 33—33 of a hook member 34, formed of bent wire are engaged, the side legs of this hook member being positioned between lugs 35—35 provided at the lower ends of the ears 30 to rigidly retain the position of the hook member. The plurality of holes 32 permits the length of the hook member to be increased or diminished, so as to adapt it for connection to side rails of different thicknesses.

The hook member is bent substantially at right angles so as to engage beneath the rail 22 in the fastened position as shown in Fig. 5. In this position the pivotal connection of the crank extension 28 with the connecting member 29 is inwardly of the pivotal connection of the handle member 27 with the ears 26, so that a toggle action results which retains the fastening device in place when the handle 27 is pressed against the upper surface of the cleat. The fastening device is disengaged simply by lifting the handle, as shown in Fig. 8, which swings the hook member downwardly and outwardly. This fastening device retains the seat securely in place and may be quickly and easily operated to open position to permit sliding adjustment of the position of the seat upon the side rails.

We have illustrated and described a preferred and satisfactory embodiment of the invention, but it will be understood that changes may be made therein, within the spirit and scope thereof, as defined in the appended claims.

What is claimed is:

1. An auxiliary seat for baby buggies of the type having substantially vertical spaced parallel side walls and horizontal side rails respectively provided at the outer sides of said side walls and having upper surfaces substantially flush with the upper edges of said side walls and lower surfaces disposed outwardly of said side walls, comprising a seat structure including substantially vertically disposed spaced parallel sides, horizontal cleats secured to and projected from said sides and adapted to slideably engage the upper surfaces of said rails for forward and rearward adjustment, strip members secured to the underside of said cleats in contact with the outer surface of said sides and the inner surface of said side walls to position said seat structure against lateral displacement between said rails, and clamping means carried by said cleats and cooperatively engageable with the lower surfaces of said rails to secure the adjusted position of said seat structure.

2. The invention as defined in claim 1, further characterized by said strip members being of rectangular cross-section of substantially greater dimension in one direction than the other, and by securing means removably securing said strip members in engaging relation with the undersides of said cleats and the outer surfaces of said sides with their greater dimension disposed either vertically or horizontally, and whereby the outer surfaces of said strips are engageable with the inner surfaces of the side walls of the baby buggy spaced at different distances apart and respectively corresponding to the different distances apart of said outer surface of said strips in their respective horizontal and vertical positions.

WALTER H. LONG.
BETTY RUTH LONG.

REFERENCES CITED

The following references are of record in the file of this patent:

UNITED STATES PATENTS

| Number | Name | Date |
| --- | --- | --- |
| 174,518 | Gorton | Mar. 7, 1876 |
| 249,309 | Comstock et al. | Nov. 8, 1881 |
| 317,985 | Forncrook | May 19, 1885 |